A. Whitcomb.
Copying Press.
N° 22524.   Patented Jan. 4, 1859.
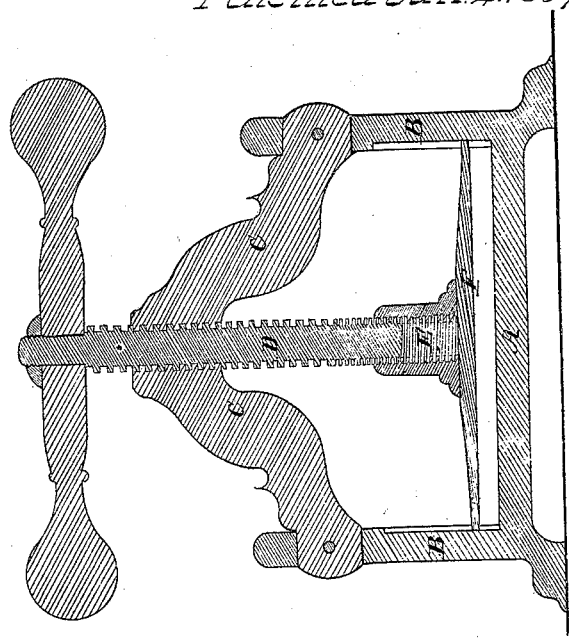
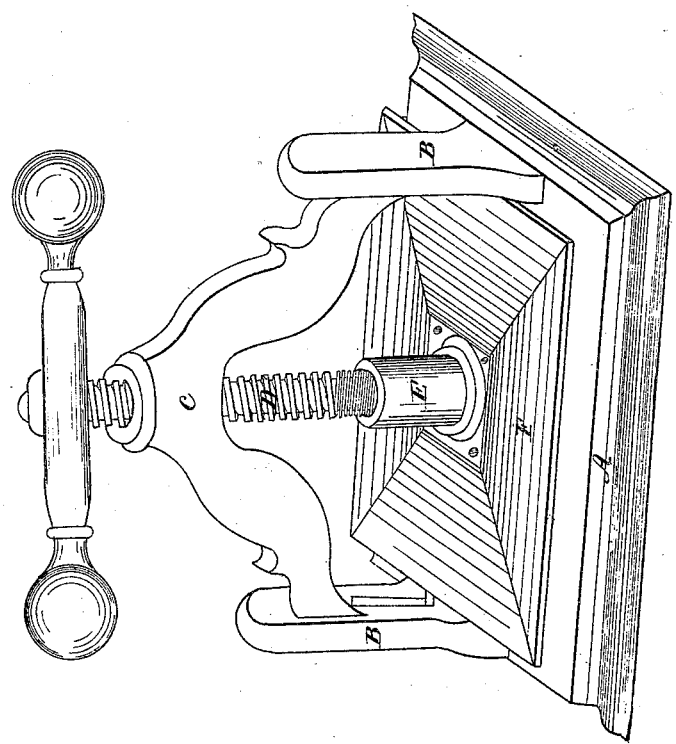
Witnesses;
Inventor;
Alonzo Whitcomb

UNITED STATES PATENT OFFICE.

ALONZO WHITCOMB, OF WORCESTER, MASSACHUSETTS.

COPYING-PRESS.

Specification of Letters Patent No. 22,524, dated January 4, 1859.

*To all whom it may concern:*

Be it known that I, ALONZO WHITCOMB, of the city and county of Worcester, State of Massachusetts, have invented certain new and useful Improvements in Copying-Presses, of which the following is a full, clear, and exact description, reference being had to the accompanying drawings, forming part of this specification, in which—

Figure 1 represents a perspective view of a copy press embracing my improvements and Fig. 2 represents a vertical section of the same on the line $x\ x$ of Fig. 1.

My improvement in copying presses relate to the mode of connecting the lower end of the screw with the platen or follower. Heretofore this connection has generally been made through a cap bolted to the upper side of the platen into which the lower end of the screw enters and is riveted to a washer slightly larger than the hole in the cap through which the screw enters, and a shoulder on the screw bears on the top of the cap. Another mode has been used in which a screw extending from the platen enters the press screw, which is made hollow to receive it, with a thread on the interior corresponding with that on the follower screw. Both of these modes are defective: the first from the liability of the screw being detached from the washer and drawing out, and from the collection of dust and dirt between the cap and the screw, without any way of removing the same, thereby increasing the friction of the moving parts.

With the latter mode of connecting, the press screw is weakened by being drilled out to receive the follower screw, and in order to give it sufficient strength a much larger screw is required, which materially increases the cost and weight of the press.

My improvement in copying presses consists in forming the connection between the screw and the platen by means of a hollow cap bolted to the platen, on the interior of which a screw is threaded to correspond with a thread on the lower end of the screw which enters the cap when the screw also passes through and traverses a nut in the cross bar; by which means the screw and platen are not liable to be disconnected, the moving parts are made accessible, so they can be easily cleaned, and the strength of the screw is not diminished, or the weight or expense of the press materially increased and at the same time the screw traverses with greater ease and less friction.

In the accompanying drawing is represented a copying press embracing my improvement, which in most particulars is constructed similar to the ordinary copying press with a bed plate (A) from whose upper side near the edge uprights (B) extend connected by a cross bar (C) at the top. Through a hole in the center of the cross bar which is enlarged at this point, a screw (D) passes into the hole being threaded to correspond with the thread on the screw. The lower end of the screw is connected with a platen (F) or follower by means of a cap (E) into which it enters, and the hole in the cap is also threaded to correspond with a thread cut on the lower end of the screw.

The head, or portion of the screw which enters the cap may either be the same pitch or less than that on the upper part which plays through the cross bar; in the present instance it is a much finer thread; and it may also turn in the same or the opposite direction. The advantages of this mode of connecting the screw over that usually adopted by riveting the screw to a washer in the cap are, that there is no liability of these parts being disconnected, as the number of turns on the lower screw exceed those on the upper within the range of motion it has in raising or lowering the platen. Its strength is greater as the bearing surface is more extended, and it is easily kept clean, so there will be no accumulation of dirt to increase the friction. Neither has it any of the disadvantages attendant on the shank projecting from the platen and entering the screw, as the size and weight of the screw are not increased beyond those ordinarily used in presses of this description, nor the expense of construction materially varied, while a better and more effective press is made in which the power may be increased by the thread which enters the cap running in the same direction as that passing through the cross bar; or if quick motion is required the threads may run in opposite directions.

Having thus described my improvement in screw presses, what I claim therein as new, and desire to secure by Letters Patent is:

When the screw is arranged to pass through and traverse a nut in the cross bar, connecting the screw and platen with each other in presses, by means of a cap on the upper side of the platen with a spiral thread on its interior to correspond with the thread on the lower end of the screw, substantially as described for the purpose as set forth.

In testimony whereof I have subscribed my name.

ALONZO WHITCOMB.

Witnesses:
STEPHEN P. TWISS,
ABEL M. CHAFFEE.